United States Patent [19]

Ribich

[11] 4,032,251

[45] June 28, 1977

[54] COUNTERSINKING AND DEBURRING TOOL

[75] Inventor: Thomas Anthony Ribich, Cleveland, Ohio

[73] Assignee: The Weldon Tool Company, Cleveland, Ohio

[22] Filed: May 5, 1975

[21] Appl. No.: 574,389

[52] U.S. Cl. .............................. 408/199; 408/225
[51] Int. Cl.² ........................................ B23B 51/10
[58] Field of Search ............ 408/82, 199, 207–209, 408/223–225, 229, 230; 145/116 R, 122, 124

[56] References Cited

UNITED STATES PATENTS

| 2,749,909 | 6/1956 | Ullery et al. | 408/207 X |
| 2,829,543 | 4/1958 | Bergstrom | 408/207 X |
| 2,829,544 | 4/1958 | Bergstrom | 408/225 |
| 2,898,787 | 8/1959 | Hofbauer | 408/230 |
| 3,076,356 | 2/1963 | Simich | 408/223 |
| 3,248,975 | 5/1966 | Breuning | 408/207 |
| 3,836,278 | 9/1974 | McInnes | 408/199 |

Primary Examiner—Othell M. Simpson
Assistant Examiner—Fred A. Silverberg
Attorney, Agent, or Firm—Woodling, Krost, Granger & Rust

[57] ABSTRACT

A cutting tool is disclosed which has an axis of rotation and comprises a cutting portion having a tapered body and a generally conically shaped surface. Wall means extend radially into the tapered body and define a curved cutting face wall. A relieved land surface extends to and meets the cutting face wall to define a curved cutting edge. The curved cutting edge is located substantially on or at the conical surface of the tapered body. A lateral support surface is located substantially at or on the conical surface of the tapered body and at a positon generally diametrically opposed to the curved cutting edge. The conical surface of the tapered body is substantially recessed rotatively ahead of the cutting edge to the lateral support surface to provide space for chips and is, also, sufficiently recessed rotatively rearwardly of the cutting edge to the lateral support surface to prevent that area from making contact with the workpiece. A chip breaking wall is integrally connected to the cutting face wall and extends generally transverse or laterally thereto for the purpose of breaking chips which come off the cutting edge in conventional curled fashion.

16 Claims, 8 Drawing Figures

COUNTERSINKING AND DEBURRING TOOL

The present invention discloses an improved tool for performing countersinking and deburring operations in the metal cutting art.

The primary object of the present invention is to improve the mechanical functions performed by tools of this type presently on the market. Presently available tools, such as those disclosed in U.S. Pat. No. 2,829,543 and No. 2,829,544, adequately perform the function of countersking and deburring; however, they suffer from some disadvantages such as lack of lateral stability, lack of chip breaking ability and limited diametral range of cut that can be accommodated by a given tool size.

In the structure of the above referred to patents the cutting edge is formed by the intersection of a cylindrical opening with a spirally generated or relieved conical surface. This produces a structure which has some tendency to chatter in the hole in which it is operating because it does not have complete lateral stability. The range of cut which can be taken by the tool is also limited by the physical size of the cylindrical opening. Additionally, chips cut by this style of tool exit through the cylindrical opening and do not engage any kind of chip breaking wall to break the same and therefore the chips have some tendency to plug up the cylindrical exit opening.

The tool of the present invention has been designed to obviate the above referred to frailties of the prior art in that it is provided with a lateral support wall or surface generally opposite the cutting edge, to engage the wall of an opening in which the tool is working and prevent lateral shifting or chattering of the tool. The tool is, also, provided with a chip breaking wall which extends generally transverse to the cutting face wall and chips which are cut by the cutting edge curl into engagement with the chip breaking wall and break. The fact that the cutting area is entirely open and exposed insures that the present tool has broad diametral range of cut for any given physical size tool.

Other objects and a fuller understanding of this invention may be had by referring to the following description and claims, taken in conjunction with the accompanying drawings, in which:

Figure 1:
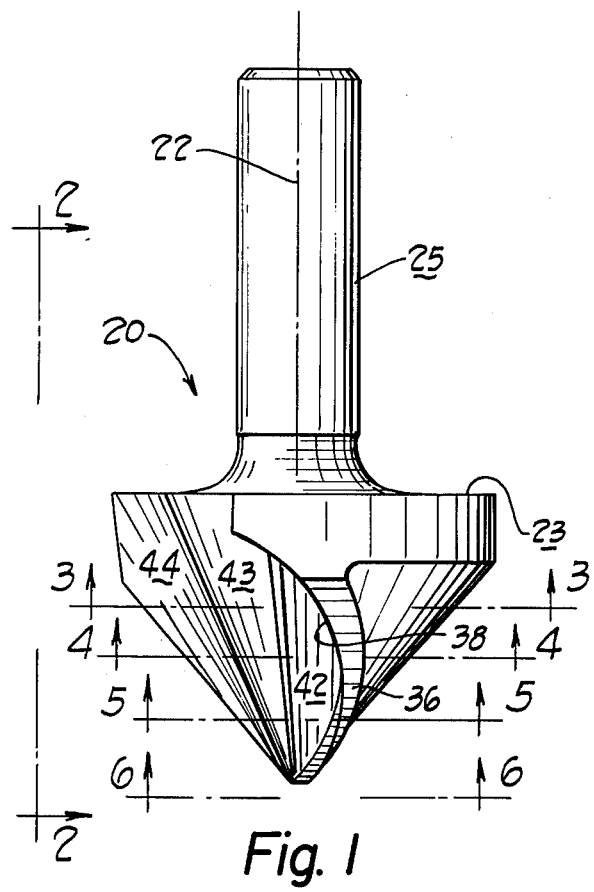
FIG. 1 is an elevational view of the rotatable cutting tool of the present invention.
Figure 2:
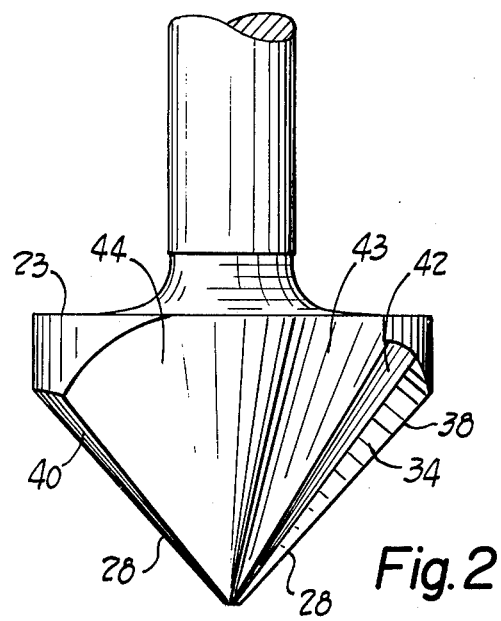
FIG. 2 is a view taken generally along the line 2—2 of FIG. 1.
Figure 3:
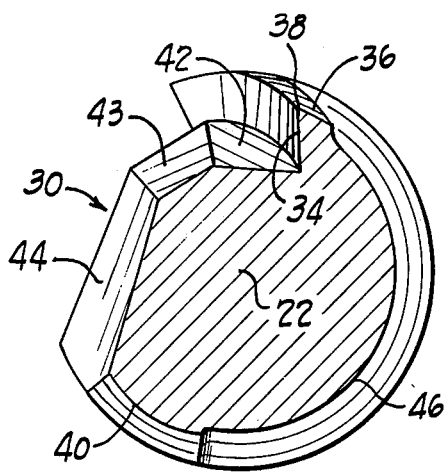
FIG. 3 is a view taken generally along the line 3—3 of FIG. 1.
Figure 4:
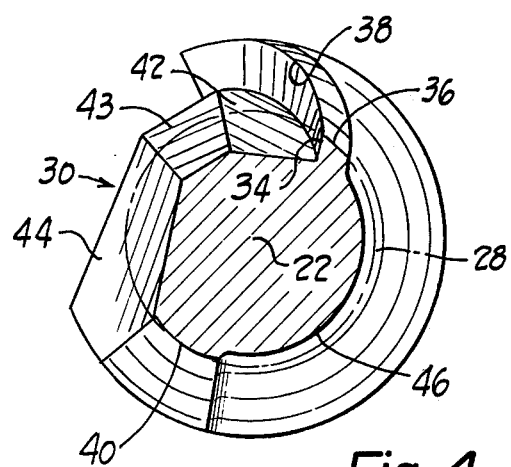
FIG. 4 is a view taken generally along the line 4—4 of FIG. 1.
Figure 5:
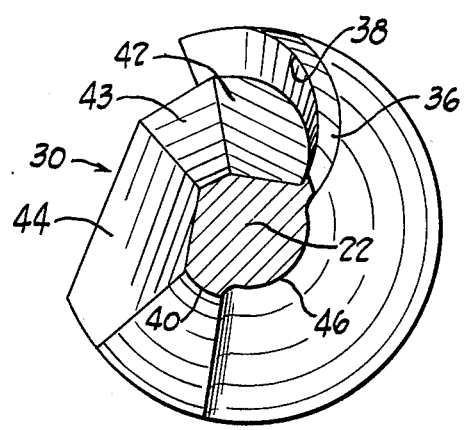
FIG. 5 is a view taken generally along the line 5—5 of FIG. 1.

The rotatable cutting tool of the present invention which is capable of performing countersinking and deburring operations is illustrated in FIGS. 1 through 6 and has been identified generally by the reference numeral 20. The tool has an axis of rotation 22 and includes a cutting portion 23 integrally connected to a shank portion 25. The shank portion is adapted to conventionally connect the cutting tool to a machine tool by means of a chuck or other conventional mechanism. The cutting portion 23 includes a generally tapered body and comprises a generally conically shaped surface 28. The conically shaped surface 28 is in effect a reference surface and will be discussed in more detail hereinafter; however, it can be said that the various surfaces of the tool are designed about the conically shaped surface 28 and as will be appreciated by those skilled in the art, there are several relief surfaces that do not fall upon the reference surface 28.

Wall means 30 extend generally radially into the tapered body in the manner shown and serve to define a cutout, as well as a curved cutting face wall 34. The curved cutting face wall extends on an arc closely approximating an arc of a circle, as best seen in FIG. 1, and in general extends somewhat radially with respect to axis 22. A relieved land surface 36 extends to and meets the cutting face wall 34 so as to define a curved cutting edge 38 which performs the countersinking and deburring functions referred to above.

A lateral support member which has a surface 40 is formed on the tapered body and is located generally diametrically opposed to the position of the curved cutting edge 38. The cutting edge 38 and the lateral support surface 40 are designed to fall substantially on the conically shaped surface 28 and the surface ahead of the cutting edge 38 and rearwardly of the cutting edge, all the way to the lateral support surface 40 are recessed so that the cutting edge can perform its cutting function. The surface 40 is crowned or has a radius smaller than the radius of the conical reference surface 28 at any given axial position (see FIGS. 3–5) so that there is only substantially a line contact with the bore of a workpiece rather than area contact by the entire surface 40. Line contact is not always possible but the design approaches this concept as a limit.

The relief ahead of the cutting edge 38 is provided by the cutout or wall means 30 which forms surfaces identified by the reference numerals 42, 43 and 44. The surface 42 is defined herein as a chip breaking wall which is integrally connected to the cutting face wall 34 and extends generally laterally or transversely thereto. The relief behind the cutting edge 38 is provided by the relieved land surface 36 and the curved surface identified by the reference numeral 46. The curved cutting face wall 34 and the curved cutting edge 38 are preferably, although not necessarily, formed or extend on the arc of a circle. It should, also, be pointed out that in this invention the tool is provided with either one or both of the lateral support surface 40 and the chip breaking wall 42.

In operation the shank portion 25 of the cutting tool is suitably attached to a machine tool to provide the motive drive power for rotating the tool and the tool is then preferably brought downwardly by the mechanism of the machine tool so the cutting portion 23 is axially entered into a hole or in a workpiece. The cutting tool is rotated by the mechanism of the machine tool and the curved cutting edge 38 engages the wall of the hole and performs its cutting function. The lateral support surface 40, which is substantially diametrically opposed to the cutting edge, engages or is located closely adjacent the wall surface of the hole at the opposite side. As a result of this structure, any tendency of the cutting tool to deflect along its axis 22 because of pressure at the cutting edge 38, is resisted by the lateral support surface 40 engaging the opposite portion of the wall of the hole. This prevents chattering of the tool and, also, prevents inaccurate metal removal by the cutting edge. The relief provided ahead of and behind the cutting edge 38 enables the cutting function to be accomplished.

Those skilled in the art will appreciate from the drawings and particularly FIG. 1 that at a point approximately between section lines 4—4 and 5—5 on curved cutting edge 38 that the helical rake is essentially zero. In the direction of section line 6—6 or toward the point of the tool the helical rake of curved cutting edge 38 becomes increasingly positive. In the direction of section line 3—3 or toward the shank portion 25, the helical rake of curved cutting edge 38 becomes increasingly negative.

As chips are removed by the curved cutting edge from the wall surface of the hole, the normal curl of the chip coming off the cutting edge directs the chips into the chip breaking wall 42 which tends to break the chips which exit the tool through cutout 30. This structure therefore, provides efficient and accurate removal of chips from a workpiece. Conventional chattering associated with these kinds of tools is essentially eliminated and the provision of the chip breaking wall 42 and the cutout 30 insures convenient and uncluttered removal of chips from the tool 20.

Figure 7:
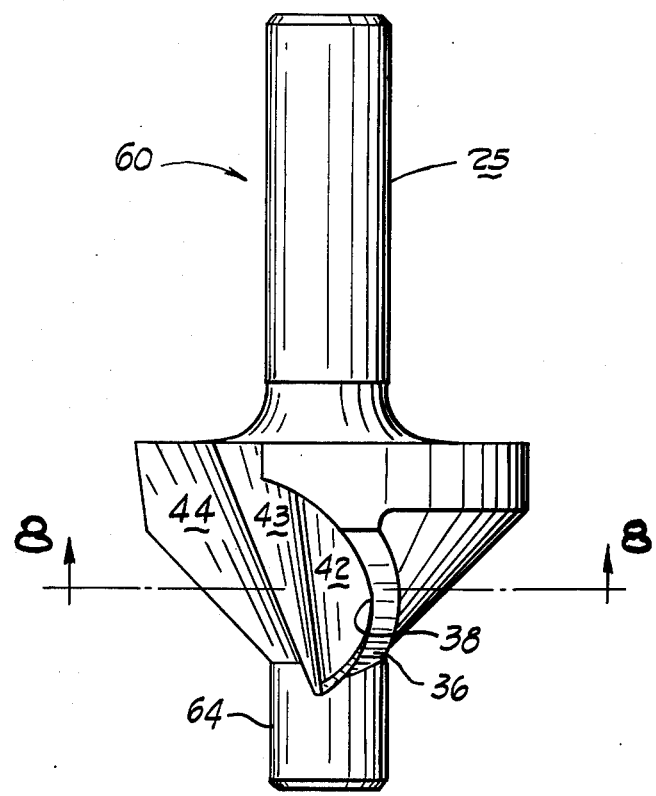
FIG. 7 is an elevational view of a cutting tool constructed in accordance with the teachings of the present invention and modified over FIG. 1 in that the cutting tool of FIG. 7 is provided with a pilot.
Figure 6:
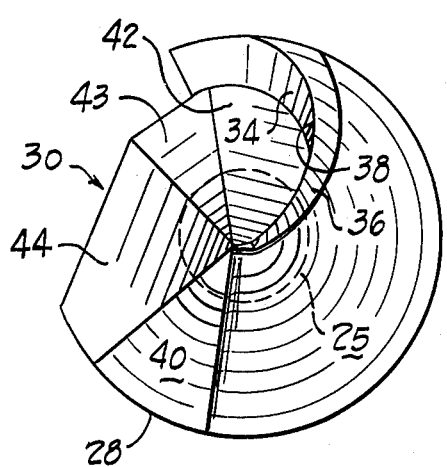
FIG. 6 is a view taken generally along the line 6—6 of FIG. 1.
Figure 8:
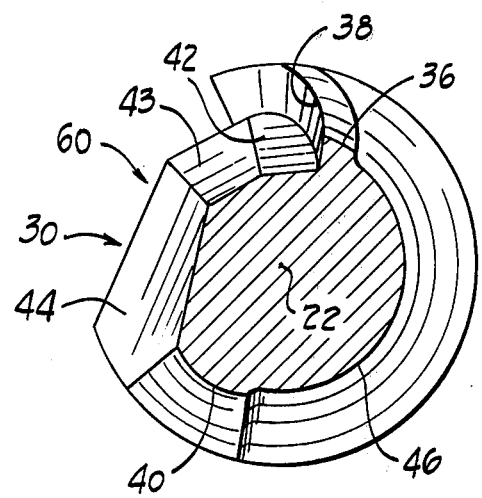
FIG. 8 is a view taken generally along the line 8—8 of FIG. 7.

FIGS. 7 and 8 illustrate a very slightly modified form of the tool shown in FIGS. 1 through 6 and this tool, for the sake of identification, has been generally indicated by the reference numeral 60. The only difference in the structure shown in FIGS. 1 through 6 over the tool shown in FIGS. 7 and 8 is the provision of a cylindrically shaped pilot 64 at the extreme end of the cutting portion of the tool which is coaxial with the tool. The pilot 64 is adapted to enter a bore or hole in a workpiece so as to guide or support the cutting tool in its cutting function. The cutting edge and other structure blend into the pilot 64 at the end in this embodiment as distinguished from extending to a point as in FIGS. 1–6. In all other respects, the structure of the two tools is essentially the same; and as a result, the other portions of the tool have been identified by the same reference numerals as utilized in FIGS. 1 through 6. Additionally, the same advantages flow from use of the tool shown in FIGS. 7 and 8, as in the tool shown and described in conjunction with FIGS. 1 through 6.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A countersinking tool having an axis of rotation and comprising a shank portion, a cutting portion integrally connected to said shank portion and including a generally tapered body having a generally conically shaped reference surface, wall means extending generally radially into said tapered body and defining a curved cutting face wall, said curved cutting face wall extending substantially on the arc of a circle, a relieved land surface extending to and meeting said cutting face wall to define a curved cutting edge, said curved cutting edge located substantially on said conically shaped reference surface of said tapered body, a lateral support member located generally diametrically opposed to said curved cutting edge, said lateral support member having a curved support surface with only a portion thereof located substantially on said conically shaped reference surface of said tapered body, said tapered body being recessed rotatively ahead of said cutting edge to said lateral support member and rearwardly of said cutting edge to said lateral support member, and a chip breaking wall integrally connected to said tapered body and extending transverse to said cutting face wall.

2. A countersinking tool as claimed in claim 1, wherein a cylindrical pilot is integrally secured to said cutting portion opposite said shank and is coaxial with said tool.

3. A cutting tool having an axis of rotation and comprising a cutting portion having a generally tapered body, wall means extending into said tapered body and defining a curved cutting face wall, a relieved land surface extending to and meeting said cutting face wall to define a curved cutting edge, said curved cutting edge located substantially on a conical reference surface, a support surface located generally diametrically opposed to said curved cutting edge and located substantially on said conical reference surface, said tapered body being recessed rotatively ahead of said cutting edge to said support surface and rearwardly of said cutting edge to said support surface, and a chip breaking wall extending generally transverse to said cutting face wall.

4. A cutting tool as claimed in claim 3, wherein said curved cutting face wall extends on the arc of a circle.

5. A cutting tool as claimed in claim 3, wherein a cylindrical pilot is secured to said cutting portion and is located coaxial therewith.

6. A cutting tool having an axis of rotation and comprising a shank portion, a cutting portion integrally connected to said shank portion and including a generally tapered body, wall means extending generally radially into said tapered body and defining a curved cutting face wall, a relieved land surface extending to and meeting said cutting face wall to define a curved cutting edge, said curved cutting edge located substantially on a conical reference surface, a lateral support surface located generally diametrically opposed to said curved cutting edge and located substantially on said conical reference surface, said tapered body being recessed rotatively ahead of said cutting edge to said lateral support surface and rearwardly of said cutting edge to said lateral support surface, and a chip breaking wall extending generally transverse to said cutting face wall.

7. A cutting tool as claimed in claim 6, wherein said curved cutting face wall extends on the arc of a circle.

8. A cutting tool as claimed in claim 6, wherein a cylindrical pilot is secured to said cutting portion opposite said shank portion.

9. A cutting tool having an axis of rotation and comprising a shank portion, a cutting portion integrally connected to said shank portion and including a generally tapered body, wall means extending generally radially into said tapered body and defining a curved cutting face wall, a relieved land surface extending to and meeting said cutting face wall to define a curved cutting edge, said curved cutting edge located substantially on a conical reference surface, said tapered body being recessed rotatively ahead of said cutting edge and rearwardly of said cutting edge, and a chip breaking wall integrally connected to said tapered body and extending generally transverse to said cutting face wall.

10. A cutting tool as claimed in claim 9, wherein a cylindrical pilot is secured to said cutting portion opposite said shank portion.

11. A cutting tool having an axis of rotation and comprising a shank portion, a cutting portion integrally connected to said shank portion and including a generally tapered body, wall means extending generally radially into said tapered body and defining a curved cutting face wall, a relieved land surface extending to and meeting said cutting face wall to define a curved cutting edge which is curved in an axial direction, said curved cutting edge located substantially on a conical reference surface, a lateral support surface located generally diametrically opposed to said curved cutting edge and located substantially on said conical reference surface, and said tapered body being recessed rotatively ahead of said cutting edge to said lateral support surface and rearwardly of said cutting edge to said lateral support surface.

12. A cutting tool as claimed in claim 11, wherein a cylindrical pilot is secured to said cutting portion opposite said shank portion.

13. A countersinking tool having an axis of rotation and comprising a shank portion, a cutting portion integrally connected to said shank portion and including a generally tapered body, wall means extending generally radially into said tapered body and defining a curved cutting face wall, said curved cutting face wall extending substantially on the arc of a circle, a relieved land surface extending to and meeting said cutting face wall to define a curved cutting edge which provides both positive and negative helical rake conditions, a lateral support member located generally diametrically opposed to said curved cutting edge, said tapered body being recessed rotatively ahead of said cutting edge to said lateral support member and rearwardly of said cutting edge to said lateral support member, and a chip breaking wall integrally connected to said tapered body and extending transverse to said cutting face wall.

14. A countersinking tool as claimed in claim 13, wherein a cylindrical pilot is integrally secured to said cutting portion opposite said shank and is coaxial with said tool.

15. A cutting tool having an axis of rotation and comprising a shank portion, a cutting portion integrally connected to said shank portion and including a generally tapered body, wall means extending generally radially into said tapered body and defining a curved cutting face wall, a relieved land surface extending to and meeting said cutting face wall to define a curved cutting edge which provides both positive and negative helical rake conditions, a lateral support surface located generally diametrically opposed to said curved cutting edge, and said tapered body being recessed rotatively ahead of said cutting edge to said lateral support surface and rearwardly of said cutting egdge to said lateral support surface.

16. A cutting tool as claimed in claim 15, wherein a cylindrical pilot is secured to said cutting portion opposite said shank portion.

* * * * *